US011614922B2

(12) United States Patent
Brown et al.

(10) Patent No.: US 11,614,922 B2
(45) Date of Patent: *Mar. 28, 2023

(54) INTEGRATION OF LEARNING MODELS INTO A SOFTWARE DEVELOPMENT SYSTEM

(71) Applicant: Apple Inc., Cupertino, CA (US)

(72) Inventors: Alexander B. Brown, Mountain View, CA (US); Michael R. Siracusa, Mountain View, CA (US); Gaurav Kapoor, Santa Clara, CA (US); Elizabeth Ottens, San Francisco, CA (US); Christopher M. Hanson, Campbell, CA (US); Zachary A. Nation, Seattle, WA (US); Vrushali Mundhe, Fremont, CA (US); Srikrishna Sridhar, Seattle, WA (US)

(73) Assignee: Apple Inc., Cupertino, CA (US)

( * ) Notice: Subject to any disclaimer, the term of this patent is extended or adjusted under 35 U.S.C. 154(b) by 9 days.

This patent is subject to a terminal disclaimer.

(21) Appl. No.: 17/129,782

(22) Filed: Dec. 21, 2020

(65) Prior Publication Data

US 2021/0109718 A1 Apr. 15, 2021

Related U.S. Application Data

(63) Continuation of application No. 16/430,351, filed on Jun. 3, 2019, now Pat. No. 10,871,949, which is a (Continued)

(51) Int. Cl.
*G06F 8/30* (2018.01)
*G06N 20/00* (2019.01)
(Continued)

(52) U.S. Cl.
CPC ............... *G06F 8/315* (2013.01); *G06F 8/35* (2013.01); *G06N 20/00* (2019.01); *G06F 8/10* (2013.01);
(Continued)

(58) Field of Classification Search
None
See application file for complete search history.

(56) References Cited

U.S. PATENT DOCUMENTS 6,003,048 A 12/1999 Fallside
6,549,918 B1 * 4/2003 Probert, Jr. ........... G06F 16/258
(Continued)

FOREIGN PATENT DOCUMENTS

| CN | 1347620 | 5/2002 |
|----|---------|--------|
| CN | 103677835 | 3/2014 |
| WO | WO 2017/024242 | 2/2017 |

OTHER PUBLICATIONS

Tveit et al., "DeepLearningKit—an GPU Optimized Deep Learning Framework for Apple's iOS, OS X and tvOS developed in Metal and Swift," May 2016, 9 pages, retrieved from https://arxiv.org/pdf/1605.04614v1.pdf.

(Continued)

*Primary Examiner* — Philip Wang
(74) *Attorney, Agent, or Firm* — BakerHostetler

(57) ABSTRACT

The subject technology transforms a machine learning model into a transformed machine learning model in accordance with a particular model specification when the machine learning model does not conform to the particular model specification, the particular model specification being compatible with an integrated development environment (IDE). The subject technology generates a code interface and code for the transformed machine learning model, the code interface including code statements in the object ori- (Continued)

ented programming language, the code statements corresponding to an object representing the transformed machine learning model. Further, the subject technology provides the generated code interface and the code for display in the IDE, the IDE enabling modifying of the generated code interface and the code.

20 Claims, 7 Drawing Sheets

Related U.S. Application Data continuation of application No. 15/721,712, filed on Sep. 29, 2017, now Pat. No. 10,310,821.

(60) Provisional application No. 62/514,780, filed on Jun. 3, 2017.

(51) Int. Cl.
*G06F 8/35* (2018.01)
*G06F 8/10* (2018.01)
*G06F 8/36* (2018.01)
*G06F 8/60* (2018.01)
*G06F 8/71* (2018.01)

(52) U.S. Cl.
CPC .................. *G06F 8/30* (2013.01); *G06F 8/36* (2013.01); *G06F 8/60* (2013.01); *G06F 8/71* (2013.01)

(56) References Cited

U.S. PATENT DOCUMENTS

| | | | |
|---|---|---|---|
| 6,877,155 B1* | 4/2005 | Lindsey | G06F 8/10 |
| | | | 717/107 |
| 9,026,997 B2* | 5/2015 | Gangadharappa | G06F 9/44 |
| | | | 717/124 |
| 9,483,240 B1* | 11/2016 | Boyar | G06F 8/72 |
| 2006/0293934 A1 | 12/2006 | Tsyganskiy et al. | |
| 2014/0365190 A1 | 12/2014 | Mahate et al. | |
| 2016/0012350 A1* | 1/2016 | Narayanan | G06F 9/4552 |
| | | | 706/12 |
| 2016/0098254 A1* | 4/2016 | Paternostro | G06F 9/44589 |
| | | | 717/105 |
| 2017/0039062 A1 | 2/2017 | Wood et al. | |
| 2017/0212737 A1* | 7/2017 | Wolfram | G06F 3/0482 |
| 2018/0005134 A1* | 1/2018 | Kish | G06N 3/084 |
| 2018/0293462 A1* | 10/2018 | Ambati | G06K 9/6232 |
| 2018/0314975 A1* | 11/2018 | Zang | G06N 20/00 |
| 2018/0349103 A1* | 12/2018 | Brown | G06F 8/315 |
| 2018/0349109 A1* | 12/2018 | Brown | G06F 8/10 |
| 2018/0349114 A1* | 12/2018 | Brown | G06F 8/427 |
| 2020/0125656 A1 | 4/2020 | Ravi | |
| 2020/0125956 A1* | 4/2020 | Ravi | G06K 9/6256 |

OTHER PUBLICATIONS

International Search Report and Written Opinion from PCT/US2018/028414, dated Jul. 17, 2018, 13 pages.
International Search Report and Written Opinion from PCT/US2018/028416, dated Jul. 17, 2018, 12 pages.

* cited by examiner

INTEGRATION OF LEARNING MODELS INTO A SOFTWARE DEVELOPMENT SYSTEM

CROSS-REFERENCE TO RELATED APPLICATIONS

The present application is a continuation application of U.S. application Ser. No. 16/430,351, entitled "INTEGRATION OF LEARNING MODELS INTO A SOFTWARE DEVELOPMENT SYSTEM," filed on Jun. 3, 2019, which is a continuation application of U.S. application Ser. No. 15/721,712, entitled "INTEGRATION OF LEARNING MODELS INTO A SOFTWARE DEVELOPMENT SYSTEM," filed on Sep. 29, 2017, now U.S. Pat. No. 10,310,821, which claims the benefit of U.S. Provisional Patent Application Ser. No. 62/514,780, entitled "INTEGRATION OF LEARNING MODELS INTO A SOFTWARE DEVELOPMENT SYSTEM," filed Jun. 3, 2017, each of which are hereby incorporated herein by reference in their entirety and made part of the present U.S. Utility Patent Application for all purposes.

TECHNICAL FIELD

The present description relates generally to integration of learning models into a software development system, including transformation and presentation of machine learning models in integrated development environments.

BACKGROUND

Software development environments can be used to create a software program in a given programming language on different computing platforms.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Existing approaches for enabling software developers to utilize machine learning models in software development environments may require a significant amount of configuration. In some instances, developing machine learning models requires setting up additional software libraries, hardware configurations, etc., which may create a perceived barrier to entry for some software developers. Further, many software developers are well-versed in working in the paradigms of object oriented programming that are integrated in many existing tools for developing software. In comparison, recent developments in the machine learning area have produced software libraries, provided by different third parties, that are designed to work in a stand-alone or separate development environments and can require software developers to adopt a different approach to developing machine learning models that depart, sometimes quite extensively, from the understood concepts of object oriented programming that many developers are accustomed.

In one or more implementations described herein, machine learning (ML) models can be internally represented within an integrated software development environment (IDE) in a manner analogous to internal representations of first class objects such as functions, classes, and the like, as opposed to merely being represented as opaque resources of the program being built. A software developer working with such a model can then take advantage of productivity features of the IDE such as syntax checking while typing, auto-completion, detection of name or type errors in parameter lists, etc., for invocations of the ML model functionality just as the developer might when using a standard system library or class. Mechanisms to achieve this include having a standard specification for description of ML models, creation of derived data from the model that is then used to index names and keywords within the model, and use of these indexed names and keywords by the IDE to provide the improved functionality described above.

Figure 1:
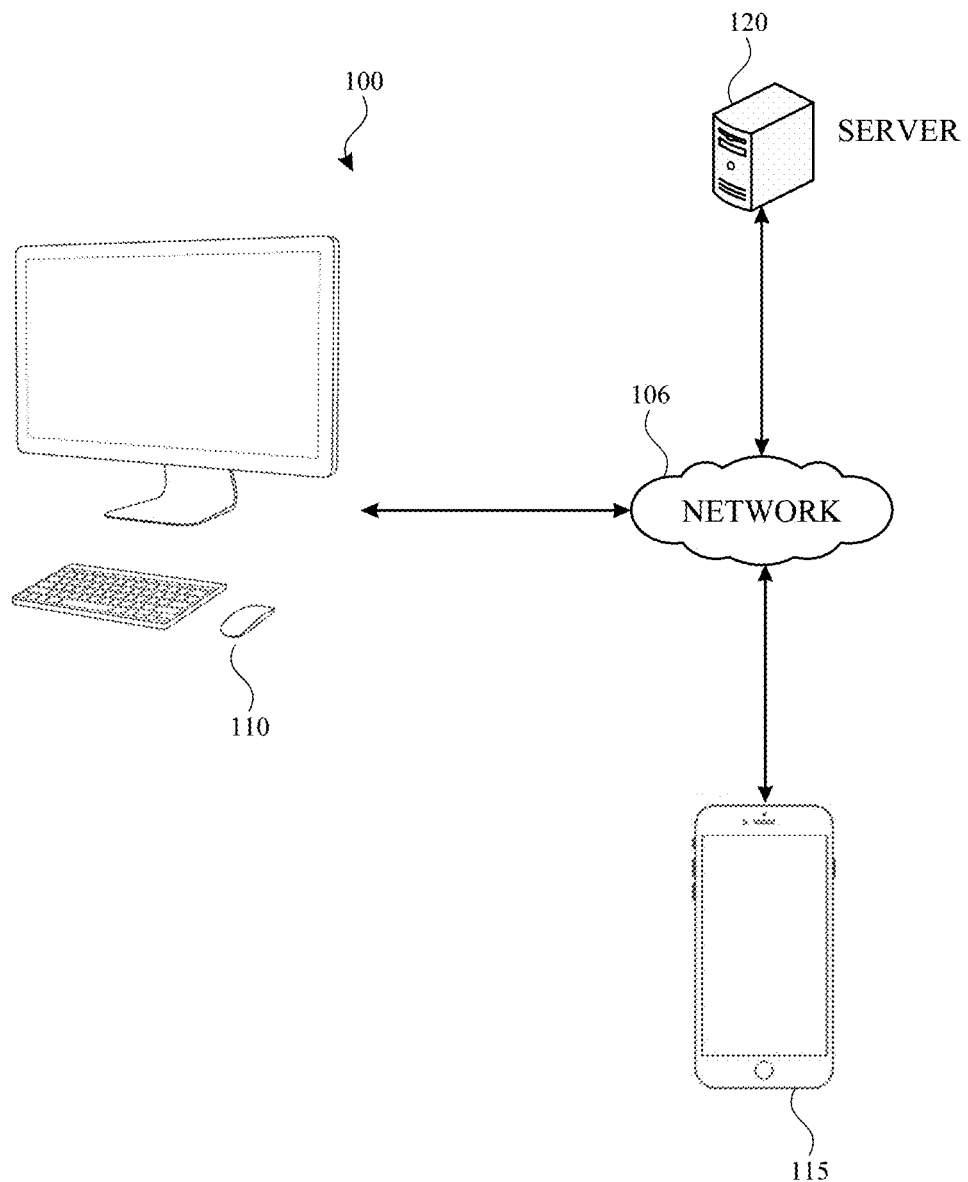
FIG. 1 illustrates an example network environment in which a system for integrating learning models into a software development system may be implemented in accordance with one or more implementations.

FIG. 1 illustrates an example network environment 100 in which a system for integrating learning models into a software development system may be implemented in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110, an electronic device 115, and a server 120. The network 106 may communicatively (directly or indirectly)

couple the electronic device 110 and/or the server 120. In one or more implementations, the network 106 may be an interconnected network of devices that may include, or may be communicatively coupled to, the Internet. For explanatory purposes, the network environment 100 is illustrated in FIG. 1 as including electronic devices 110 and 115, and a server 120; however, the network environment 100 may include any number of electronic devices and any number of servers, such as a cloud of servers.

The electronic device 110 may be, for example, desktop computer, a portable computing device such as a laptop computer, a smartphone, a peripheral device (e.g., a digital camera, headphones), a tablet device, a wearable device such as a watch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 110 is depicted as a desktop computer. The electronic device 110 may be, and/or may include all or part of, the electronic system discussed below with respect to FIG. 7.

The electronic device 115 may include a touchscreen and may be, for example, a portable computing device such as a laptop computer that includes a touchscreen, a smartphone that includes a touchscreen, a peripheral device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In one or more implementations, the electronic device 115 may not include a touchscreen but may support touchscreen-like gestures, such as in a virtual reality or augmented reality environment. In one or more implementations, the electronic device 115 may include a touchpad. In FIG. 1, by way of example, the electronic device 115 is depicted as a mobile device with a touchscreen. In one or more implementations, the electronic device 115 may be, and/or may include all or part of, the electronic device discussed below with respect to the electronic system discussed below with respect to FIG. 7.

In one or more implementations, the electronic device 110 may provide a software development environment such as a computer program that a software developer can use to create compiled (e.g., executable) code, debug, maintain, or otherwise support computer programs and applications. For example, the software development environment, using the compiled code, can create a software package for deployment on a target device with facilitation from the server 120.

In one or more implementations, the server 120 deploys the compiled code to a target device for execution. The electronic device 115, in an example, may be a target device for receiving the compiled code and executing the compiled code in a runtime environment of the electronic device 115. In another example, the server 120 (and/or another server) may provide a web service and can perform operations associated with the compiled code, such as complex processing operations.

Figure 2:
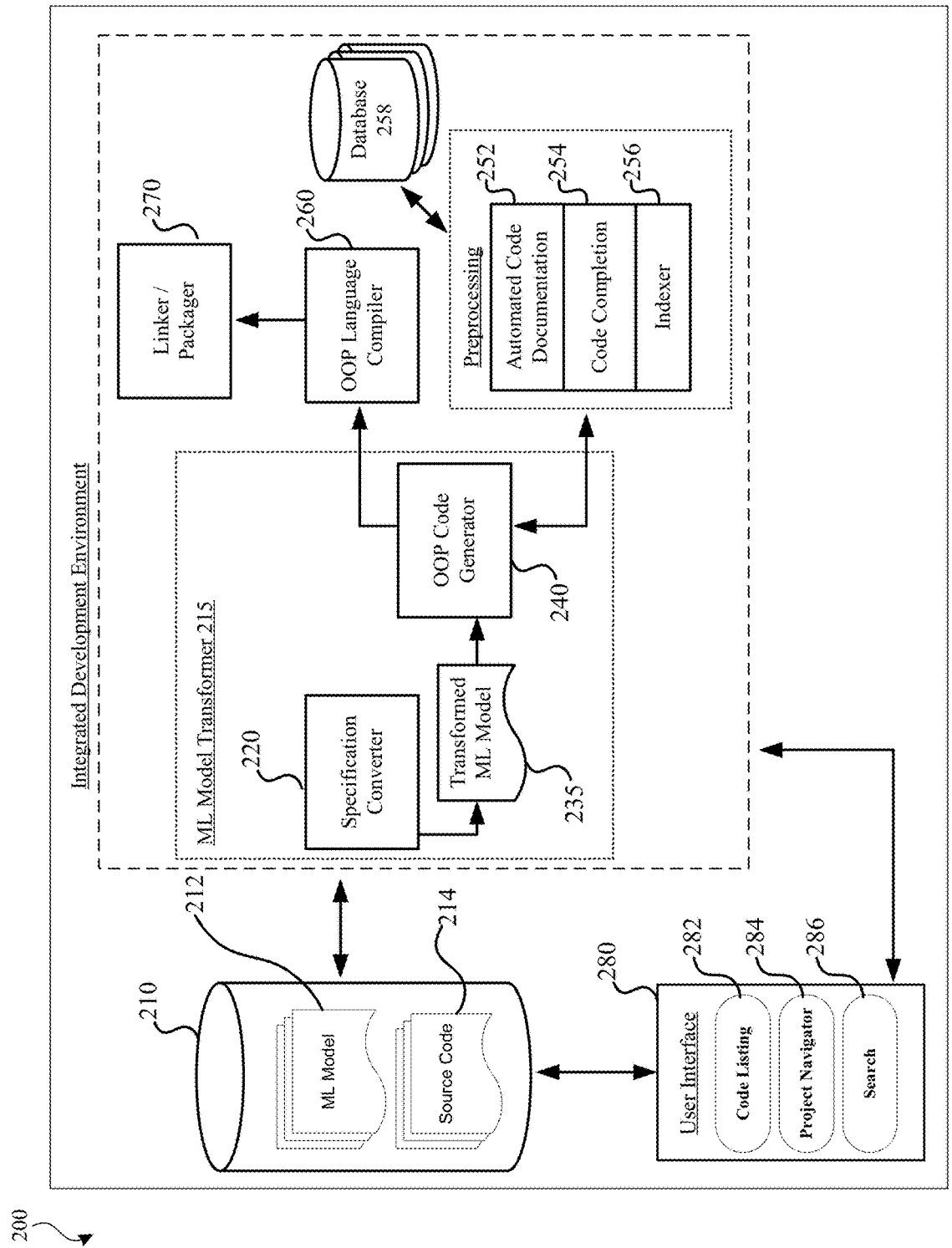
FIG. 2 illustrates an example software architecture for an integrated development environment that integrates machine learning (ML) models with object oriented code in accordance with one or more implementations.

FIG. 2 illustrates an example software architecture for an integrated development environment 200 that integrates machine learning models with object oriented code in accordance with one or more implementations. For explanatory purposes, the integrated development environment (IDE) 200 is described as being provided by the electronic device 110 of FIG. 1, such as by a processor and/or memory of the electronic device 110; however, the IDE 200 may be implemented by any other electronic device. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The IDE 200 may be a multi-platform software development environment such as, for example, the Xcode® Integrated Development Environment or the like, which provides features that software developers can use to create, run, and debug computer program code. In one or more implementations, the IDE 200 executes in a process on the electronic device 110, such as a desktop computer running an operating system, e.g., Mac OS X™ or the like.

In one or more implementations, the IDE 200 provides a user interface 280 that can be presented on a display of the electronic device 110. The user interface 280 can display a code listing 282, such as the source code of a program being developed, in an editor. The source code may be computer program code instructions in an object oriented programming language such as Swift, Objective C, C++, Python, Java, etc. The user interface 280 also provides a project navigator 284 which may be displayed when a new software development project is created. The project navigator 284 enables a user to manage files in the project and/or select a file to view or edit in the editor that provides the code listing 282. The user interface 280 also provides a search interface 286 for searching terms in the code listing 282, files in the project, and/or other assets, etc.

The IDE 200 further includes a storage 210 which stores machine learning (ML) models 212 and associated ML data (e.g., a dataset for the ML model), source code files 214 and/or other data related to software development projects of the IDE 200 in memory. The machine learning models may include data represented in a format or syntax in accordance with machine learning software libraries such as TensorFlow, Keras, Caffe, etc., which may not be supported by the IDE 200. Example machine learning models may apply machine learning techniques such as automated processes to extract patterns from data, algorithms that automatically identify a relationship between descriptive features and a target feature in a dataset (e.g., a predictive model), deep neural networks, classifiers that specify which of categories some input belongs (e.g., a classifier), etc. Other types of machine learning models are contemplated herein and the preceding examples are non-limiting to the subject technology. Further, machine learning models may be associated with (e.g., suppled with in a repository or for download from a web-page) source code usage examples, tutorials or reference implementations written in a language such as JAVA or .NET or an API which may not supported by the IDE 200 or only supported for certain deployment scenarios.

For integrating existing machine learning models (e.g., ML models 212), the IDE 200 may include a machine learning (ML) model transformer 215 that includes a specification converter 220, and an object oriented programming (OOP) code generator 240. Each of these components is further described below. An example process of transforming an existing ML model is described further below in FIG. 2. Although the ML model transformer 215 is illustrated as part of the IDE 200, in some implementations, the ML model transformer 215 may execute as a separate process from the IDE 200. Further, although objected oriented programming is mentioned with respect to the OOP code generator 240 and other components herein, it is appreciated that other types of programming languages are contemplated by the subject technology and that object oriented programming languages are used herein for purposes of explanation. In particular, any programming language may be utilized with respect to the components of the IDE 200 and still be within the scope of the subject technology.

As illustrated, the IDE 200 also provides the specification converter 220. In an example, the specification converter 220 may receive a ML model 212 from the storage 210. The specification converter 220 determines and/or validates whether an existing ML model in a first format (e.g., Keras, TensorFlow, Caffe, etc.) includes sufficient data to conform to a particular model specification (e.g., a model specification provided by a third party vendor or other entity) that is supported by or compatible with the IDE 200. An example model specification may define parameters, data formats, data types and/or processing or hardware requirements for converting a given machine learning model into a code format suitable for leveraging features provided by the IDE 200, including, for example, syntax checking while typing, auto-completion, detection of name or type errors in parameter lists, etc. The specification converter 220 transforms the ML model 212 into a transformed ML model 235 that is in a format compatible with the particular model specification (e.g., the transformed ML model) supported by the IDE 200. In an implementation, the specification converter 220 can utilize a serialization format (e.g. "ProtoBuf" or protocol buffers) to store the transformed ML model 235 in a data schema of the particular model specification.

The OOP code generator 240 generates a code interface for the transformed ML model. A code interface may refer to code statements, in a particular programming language, that describe functions and/or data types required for using the transformed ML model. A function, that uses the transformed ML model, can accept one or more data types (e.g., as input variables to the function) in an example. The code interface of the transformed ML model, in an example, therefore provides functions and data types that are compatible with the particular programming language, as used in the current project. In an example, the OOP code generator 240 determines the data types in the particular programming language and its APIs that can access existing ML data associated with the transformed model. In an example, OOP code generator 240 creates a thunk (e.g., a subroutine) that facilitates accessing values of the existing ML data via the particular data type supported in the particular programming language. An example process with more details on generating the code interface and other code for the transformed ML model is described in FIG. 3, where the programming language and its APIs support multiple types, which correspond to existing ML data types, in which the specific type chosen may be selected on the basis of appropriateness or familiarity to skilled programmers.

The OOP code generator 240, in an implementation, can be perform the following operations. For each type Tm used by the model, select a type Tpn available in the programming language and its APIs. In a case where multiple types Tp may be available, select the 'best' type such that the most frequently used would be a good choice, one that is in the programming language should be preferred to one that is only in the APIs. For each function Fm used by the model, which takes as input a set of values of Types Tmi1, Tmi2 and returns as output a set of Values Tmv1, Tmv2, etc.— generate a function which takes as inputs the corresponding types Tpi1, Tpi2 Tpi2, Tpv1, Tpv2. Inside the function, generate code that transforms each model type to or from the language type, which could be simple, or it may require multiple steps. This generated code is called a thunk.

In one or more implementations, an additional non-code based payload (e.g., "compiled ML model") is also generated from the ML model and delivered into a package sent to target device. The package may include a compiled representation of the generated code interface and the generated code, and include this compiled ML model (e.g., the non-code based payload). This non-code based payload is different than a compiled representation of the generated code interface and code discussed above. In an example, the compiled ML model in this regard includes trained weights and other information which is useful on the target device and not supplied in an appropriate form with the generated code discussed above for the following reasons: 1) source code isn't great at holding lots of data (impedance, space, speed); and 2) despite being very accessible to users, source-code types are generally not as easily introspectable as data types for machines (e.g., software)—so other components wishing to reason about the model may prefer to visit the data (e.g., determining a size of an image that a user wants).

The OOP code generator 240 may also determine which, if any, other existing software libraries (e.g., stored on the storage 210) may be required for compiling and/or executing the transformed ML model such as a graphics processing unit (GPU) library that provides support for executing instructions on a GPU. An example structure of data associated with the transformed ML model is described in more detail in FIG. 6.

Additionally, the generated code interface can be viewed in the UI 280 using the project navigator 284 in an example. An example process for viewing the generated code interface is discussed in more detail in FIG. 4.

The OOP language compiler 260 compiles the generated code interface and generates object code for the code interface.

As further shown, as part of building an executable application, a linker/packager 270 combines one or more object files (e.g., from the OOP language compiler 260) and, in some instances, code from an existing software library (e.g., GPU library for machine learning), transforms the aforementioned object code and/or library code into executable machine code that can be executed by the electronic device 110. A packager portion of the linker/packager 270 reads the executable code into memory and runs the code resulting in a running application. In another example, the linker/packager 270 can send the executable code to a target electronic device for deployment. An example process for sending a fully compiled ML model to a runtime environment of a target device is discussed in more detail in FIG. 5.

The IDE 200 further includes preprocessing components that provide different features for the transformed ML model. As illustrated, an automated code documentation component 252 performs preprocessing to enable live documentation corresponding to code being input by a user and/or existing code in the project. In an example, the automated code documentation component 252 provides information regarding aspects of the ML model code and provides additional details about the model such as a description of a given function, a listing of the parameters for the function, information related to errors, if any, thrown by the function, any return value for the function, and any comments for the code. A code completion component 254 provides auto completion suggestions of code as the user is typing into the code listing 282 in the editor of the IDE 200. An indexer provides indexing of the ML model code for searching by the search interface 286. Any data (e.g., a search index, documentation, auto completion suggestions, etc.) for the aforementioned preprocessing components may be stored in a database 258.

Figure 3:
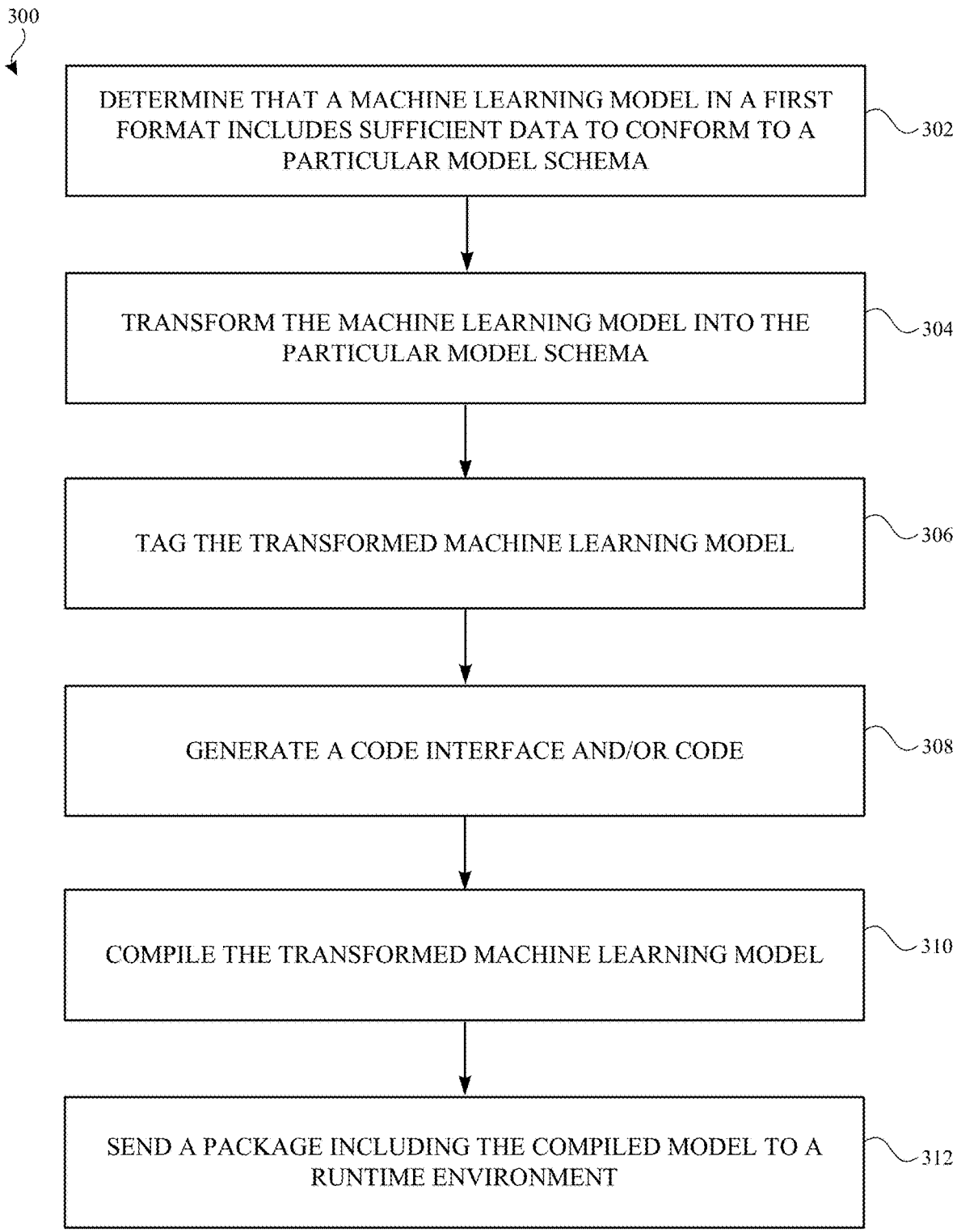
FIG. 3 illustrates a flow diagram of an example process for transforming an existing ML model to a model specification in accordance with one or more implementations.

FIG. 3 illustrates a flow diagram of an example process 300 for transforming an existing ML model to a model specification in accordance with one or more implementations. For explanatory purposes, the process 300 is primarily described herein with reference to various components of the IDE 200 of FIG. 2, which may be executed by one or more processors of the electronic device 110 of FIG. 1. However, the process 300 is not limited to the electronic device 110 and/or the IDE 200, and one or more blocks (or operations) of the process 300 may be performed by one or more other components of other suitable devices and/or software development environments. Further for explanatory purposes, the blocks of the process 300 are described herein as occurring in serial, or linearly. However, multiple blocks of the process 300 may occur in parallel. In addition, the blocks of the process 300 need not be performed in the order shown and/or one or more blocks of the process 300 need not be performed and/or can be replaced by other operations.

The ML model transformer 215 of the IDE 200 determines that a machine learning (ML) model in a first format (e.g., Keras, TensorFlow, etc.) includes sufficient data to conform to a particular model specification in a second format (302). The second format corresponds to an object oriented programming language (e.g., Swift, Objective C, etc.) in an example. In particular, the specification converter 220 can determine whether an existing model is missing data/objects required for conversion, and determine whether the existing model is not valid and/or consistent generally (e.g., incorrect data, operation(s) performed by the model not consistent with purported goal or result, etc.). In such instances where the ML model includes insufficient data or is not valid, the ML model transformer 215 may provide an error statement and forgo further processing of the ML model.

The specification converter 220 can also perform an additional transformation on the data inside the existing model to better suit the existing libraries on the user's development environment. (e.g., where the existing model is in a TensorFlow format, then transforming the model data into a format based an existing library in user's development environment).

After the ML model is determined to include sufficient data, the specification converter 220 transforms the ML model into the particular model specification and provides a transformed ML model that is therefore compatible with the particular model specification (304). In an example, transforming the ML model may include mapping ML operations (e.g., corresponding to operations performed by nodes of a graph representing the ML model) in the ML model to match corresponding operations that may be defined by the model specification. After being in this compatible format, the IDE 200 can further process the transformed ML model and provide additional functionality as described above in FIG. 1.

The specification converter 220 tags the transformed ML model to indicate that the ML model has been transformed into the particular model specification (306). For example, tagging includes assigning an identifier to the transformed ML model so that the IDE 200 can reference the transformed ML model.

The OOP code generator 240 generates a code interface and code for the transformed ML model (308). The code interface includes code statements in the object oriented programming language in which the code statements correspond to an object representing the transformed ML model. The generated code may also correspond to the object. For example, the object may include code for one or more functions for performing operations of the transformed ML model in which each function may include input data types that map to data and/or data types that are utilized by the transformed ML model. The object, the code and the code interface corresponding to the transformed model may be presented in the user interface 280 of the IDE 200 (e.g., in the code listing 282 and/or the project navigator 284).

In one or more implementations, the OOP code generator 240 performs operations to generate code for the transformed ML model. For example, the OOP code generator 240 determines input data format used by an existing ML model (e.g., 3-D matrix with floating point values that are encoded serially in memory), and determines a target data format for transformed model (e.g., NSArrays, Swift array of arrays, or a new custom N-dimensional matrix). The OOP code generator 240 determines hardware/processing requirement for the existing ML model (e.g., does the existing model run on the GPU, the CPU, or via the cloud) and generates code to run on GPU, CPU, and/or cloud, etc. Further, the OOP code generator 240 takes machine learning primitives (e.g., entities, properties, matrices, and matrices processing steps) that are in the ML model and generates data objects compliant with the particular specification. Additionally, the OOP code generator 240 maps a function call to input data types (e.g., input vector, matrix, or whatever is required for the ML model). The OOP code generator 240 generates a function in the object oriented programming language.

A software developer can edit the generated code from the OOP code generator 240. For example, the software developer can review a function that is generated and determine whether additional edits are needed. Depending on a current project that is worked on in the IDE 200, the software developer may decide that additional code, written in a given OOP programming language (e.g., Objective C, Swift, etc.) of the current project, is required to meet one of the objectives of the current project. For example, the current project may correspond to predicting a price of a residential home for a particular geographic region by utilizing a given ML model. A function corresponding to predicting the price of a home may be generated for the ML model in which the software developer decides a modification and/or additional code is needed (e.g., an adjustment to the price calculation, the usage of additional data not provided by the ML model, etc.). The software developer may then leverage the functionality of the IDE 200 by editing this function and/or creating new code that calls the function, while advantageously gaining the benefit of real-time syntax checking while typing, auto-completion, detection of name or type errors in parameter lists, etc.

After the code for the ML model is generated and/or code modified or added by the software developer, the OOP language compiler 260 compiles the generated code and/or including any code modifications or additions provided by the software developer corresponding to the transformed machine learning model (310). Compiling the transformed machine learning model includes generating object code for the object oriented programming language. The OOP language compiler 260 also compiles the code interface to the transformed ML model (e.g., to enforce certain properties on the object representing the ML model). Respective object code may be generated from compiling the generated code and code interface. Further, any code modifications or additions provided by the software developer (e.g., code that calls on the generated function) is compiled to generate respective object code.

In an example, the linker/packager 270 combines all the object code corresponding to the ML model and/or code modified or added by the software developer, and transforms the object code into executable machine code (for a target computing device). The executable machine code may be in the form of a software package that can be deployed to the target computing device for being executed in a runtime environment of the target computing device. In an example, the linker/packager 270 can send a package including the compiled code to a runtime environment of a target device (312). Another example of deploying the compiled ML model for execution on a target device is discussed in FIG. 5.

Figure 4:
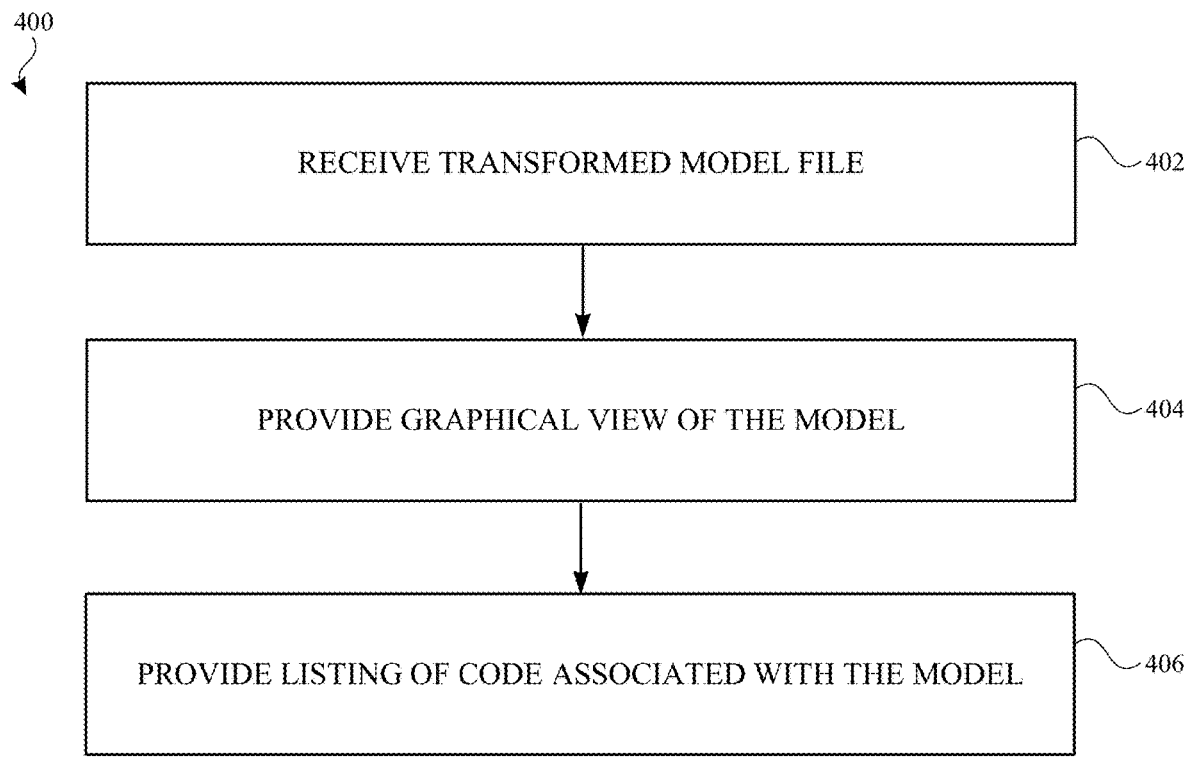
FIG. 4 illustrates a flow diagram of an example process for providing a transformed ML model for viewing in a software development environment in accordance with one or more implementations.

FIG. 4 illustrates a flow diagram of an example process 400 for providing a transformed ML model for viewing in a software development environment (e.g., the IDE 200) in accordance with one or more implementations. For explanatory purposes, the process 400 is primarily described herein with reference to components of the IDE 200 of FIG. 2, which may be executed by one or more processors of the electronic device 110 of FIG. 1. However, the process 400 is not limited to the electronic device 110 and/or the IDE 200, and one or more blocks (or operations) of the process 400 may be performed by one or more other components of other suitable devices and/or software development environments. Further for explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

The IDE 200 receives a transformed model file (402). In an example, the transformed model file is received in the IDE 200 after a user drags the file and drops the file into the user interface 280 of the IDE 200. The transformed model file may be provided, as described above, by reference to the operations described to FIG. 3, and is presumed herein to be compliant with a particular model specification supported by the IDE 200. In an example, the transformed model file may include a tag (e.g., an identifier) that indicates that the model file corresponds to the particular model specification. The IDE 200, in response to the dragged file, may create a new project corresponding to the transformed model file, or if a current project was already open, add the transformed model file to that current project.

As mentioned before, a software developer can view and/or edit the code corresponding to the transformed model file. For example, the software developer can review a function that is associated with the transformed model file and determine whether additional edits are needed. More specifically, the software developer may decide that additional code, written in a given OOP programming language (e.g., Objective C, Swift, etc.) of the current project, is required to meet one of the objectives of the current project. For example, the current project may correspond to predicting prices of residential homes for a particular geographic region by utilizing a given ML model. A function corresponding to predicting the price of a home may generated in which the software developer decides a modification and/or additional code is needed (e.g., an adjustment to the price calculation, the usage of additional data not provided by the ML model, etc.). The software developer may then leverage the functionality of the IDE 200 by editing this function and/or creating new code that calls the function, while advantageously gaining the benefit of real-time syntax checking while typing, auto-completion, detection of name or type errors in parameter lists, etc.

The IDE 200 provides a graphical view of the transformed model file (404). For example, the user interface 280 displays the model as an object (e.g., corresponding to an object oriented programming language) in the IDE 200, and the IDE 200 can provide information regarding properties of the object and/or access the data in the database 258 associated with preprocessing components of the IDE 200 (e.g., indexer 256, code completion component 254, and/or automated code documentation component 252). In another example, the project navigator 284 of the user interface 280 provides a hierarchical view of the object with different properties and/or provides a list of associated files (e.g., supporting files from a software library) or other related files/assets (e.g., images, videos, text, etc.). The user can therefore view and interact with the object in the project navigator 284 and utilize the functionality provided by the IDE 200 (e.g., to review and/or edit code corresponding to the transformed model file). Further, the user can add additional files and/or assets to the current project.

The IDE 200 provides listing of code associated with the transformed model file (406). For example, the user interface 280 provides the listing of code in the code listing 282 of the IDE 200. In this manner, the user can view and/or edit the code associated with the transformed model file and advantageously access the functionality provided by the IDE 200 such as type checking, detecting coding mistakes, debugging code, code completion, syntax highlighting, and providing other context-sensitive information with the code in the code listing 282.

In one or more implementations, the IDE 200 can deploy a compiled ML model to one or different target devices for execution. The compiled ML model may be included with a software package that is able to be deployed and executed on a given target computing device. When working on a project in the IDE 200, one or more target devices may be selected for compiling and/or deploying on the target platforms. The IDE 200 can generate different variants, which may be optimized for the particular hardware and/or software capabilities of a given platform, of the transformed ML model for deployment to such target devices. In an example, the IDE 200 can send the compiled ML model to the server 120, which can then, in turn, provide the compiled model to a target device.

Figure 5:
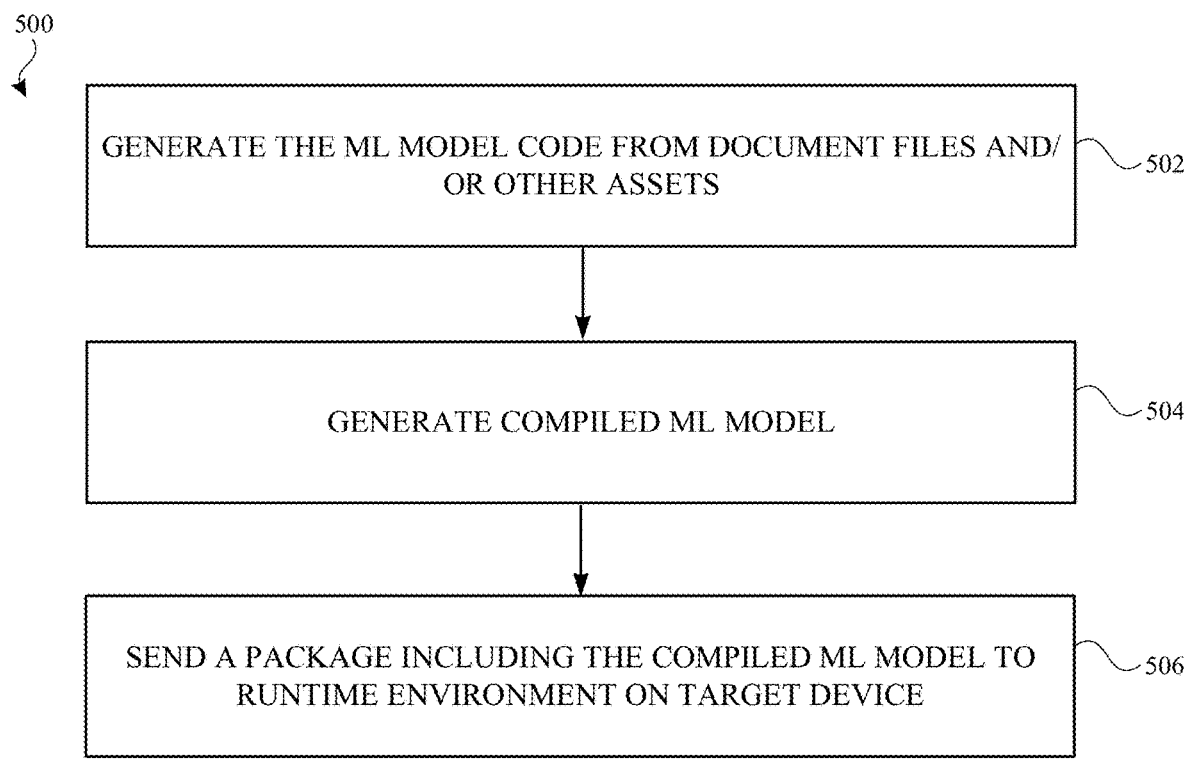
FIG. 5 illustrates an example process for sending a compiled ML model to a runtime environment of a target device in accordance with one or more implementations.

FIG. 5 illustrates an example process 500 for sending a compiled ML model to a runtime environment of a target device (e.g., the electronic device 115 in FIG. 1) in accordance with one or more implementations. For explanatory purposes, the process 500 is primarily described herein with reference to components of the IDE 200 of FIG. 2, which may be executed by the electronic device 110 of FIG. 1. However, the process 500 is not limited to the electronic device 110 and/or the IDE 200, and one or more blocks (or operations) of the process 500 may be performed by one or more other components of other suitable devices and/or software development environments. Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

The OOP code generator 240 generates the ML model code from ML document files and/or other assets (502). In an example, building the ML model code may be performed as described by reference to FIG. 3 above. In this example, generating the ML model utilizes an implementation file (e.g., the .m file) or source code (e.g., Swift or Objective C source code) and/or data and/or other code corresponding to the ML model.

A software developer can view and/or edit the source code corresponding to the ML model. For example, the software developer can review a function that is associated with the ML model and determine whether additional edits are needed. More specifically, the software developer may decide that additional code, written in a given OOP programming language (e.g., Objective C, Swift, etc.) of the current project, is required to meet one of the objectives of the current project. For example, the current project may correspond to predicting prices of residential homes for a particular geographic region by utilizing a given ML model. A function corresponding to predicting the price of a home may generated in which the software developer decides a modification and/or additional code is needed (e.g., an adjustment to the price calculation, the usage of additional data not provided by the ML model, etc.). The software developer may then leverage the functionality of the IDE 200 by editing this function and/or creating new code that calls the function, while advantageously gaining the benefit of real-time syntax checking while typing, auto-completion, detection of name or type errors in parameter lists, etc.

The OOP language compiler 260 generates compiled ML model code from the ML model code (504) and/or any additional code provided by the software developer (e.g., to call a function corresponding to an operation provided by the ML model). In an example, the OOP language compiler 260 provides compiled object code (e.g., .o file) and/or a binary file (e.g., executable machine code).

The linker/packager 270 sends a package including the compiled ML model and/or any additional code provided by the software developer to a runtime environment on a target device (or user's desktop) for execution (506). In an example, different variants may be sent corresponding to respective target device (e.g., smartphone, wearable device, streaming media device, etc.). In another example, the linker/packager 270 can send the compiled ML model into an archive or package, which is then sent into cloud (e.g., application store or application server, cloud computing service, etc.) for deployment and/or execution. The ML model may include information regarding a type of device that the model will be built for (e.g., the target runtime environment). In another example, a target device may be selected by the user in the IDE 200 so that the OOP language compiler 260 and/or the linker/packager 270 can further optimize the compiled ML model. For example, the OOP language compiler 260 can optimize compilation of the code to use a GPU of a target device when such a GPU is present on the target device. In another example, the OOP language compiler 260 can optimize compilation for execution on a cloud computing service, which may provide a service for deploying and executing the compiled code utilizing a server (e.g., the server 120) provided in the network (e.g., the network 106).

Figure 6:
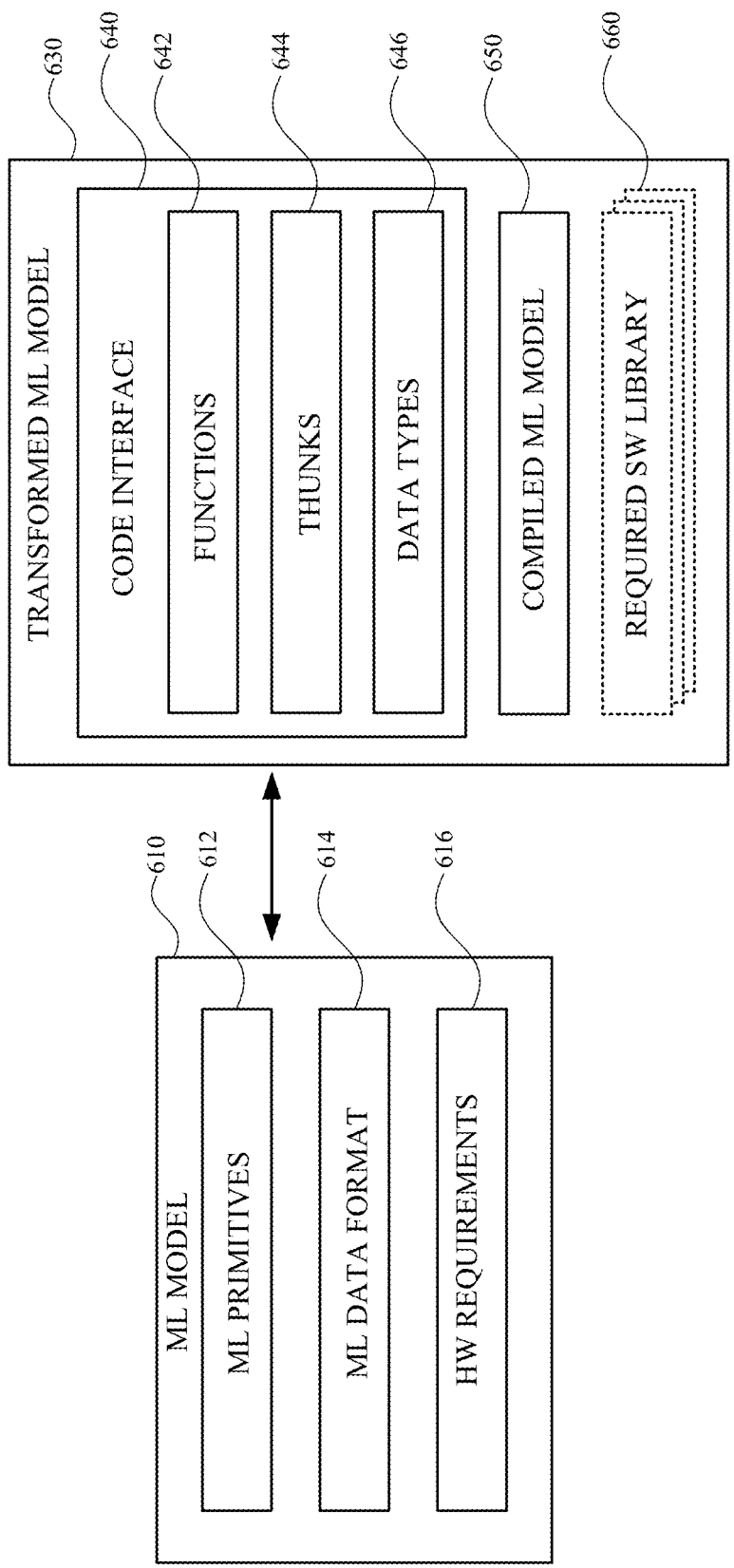
FIG. 6 illustrates an example structure of data for an existing ML model and a transformed ML model in accordance with one or more implementations.

FIG. 6 illustrates an example structure of data for an existing ML model 610 and a transformed ML model 630 in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As mentioned above in FIGS. 1-4, an existing ML model may be transformed into a transformed model that conforms to a particular model specification. As illustrated, the ML model 610 represents an existing model in a different format from the particular model specification. The ML model 610 includes ML primitives 612, ML data format 614 of ML data (e.g., ML datasets for purposes such as training, validation, testing, etc.), and a set of hardware and/or processing requirements 616. The ML primitives 612 may include primitives such as entities, properties, matrices, and matrices processing steps that are utilized by the ML model 610. The ML data format 614 may indicate that the ML data is in a format that is encoded serially in memory, or some other data format, etc. The set of set of hardware and/or processing requirements 616 may include information indicating that the ML model 610 requires the use of a GPU and/or CPU and/or a cloud computing service for particular operations.

The transformed ML model 630 includes a code interface 640. The code interface 640 includes functions 642, thunks 644, and data types 646. The functions 642 may include information that maps a function call to input data types (e.g., input vector, matrix, or whatever is required for the ML model 610). The data types 646 (e.g., NSArrays, array of arrays, such as Swift array of arrays, or a new custom N-dimensional matrix) may correspond to the ML data format 614 and enables the transformed ML model 630 to access ML data in the ML data format 614. To facilitate the access of such ML data, the thunks 644 provide subroutines for the functions 642 that are utilized. The transformed ML model 630 further includes compiled ML model code 650, which may be in object code format corresponding to a target device. Optionally, the transformed ML model 630 includes one or more required software libraries 660 depending on the set of hardware and/or processing requirements 616 (e.g., GPU processing, cloud computing, etc.) of the ML model 610.

Figure 7:
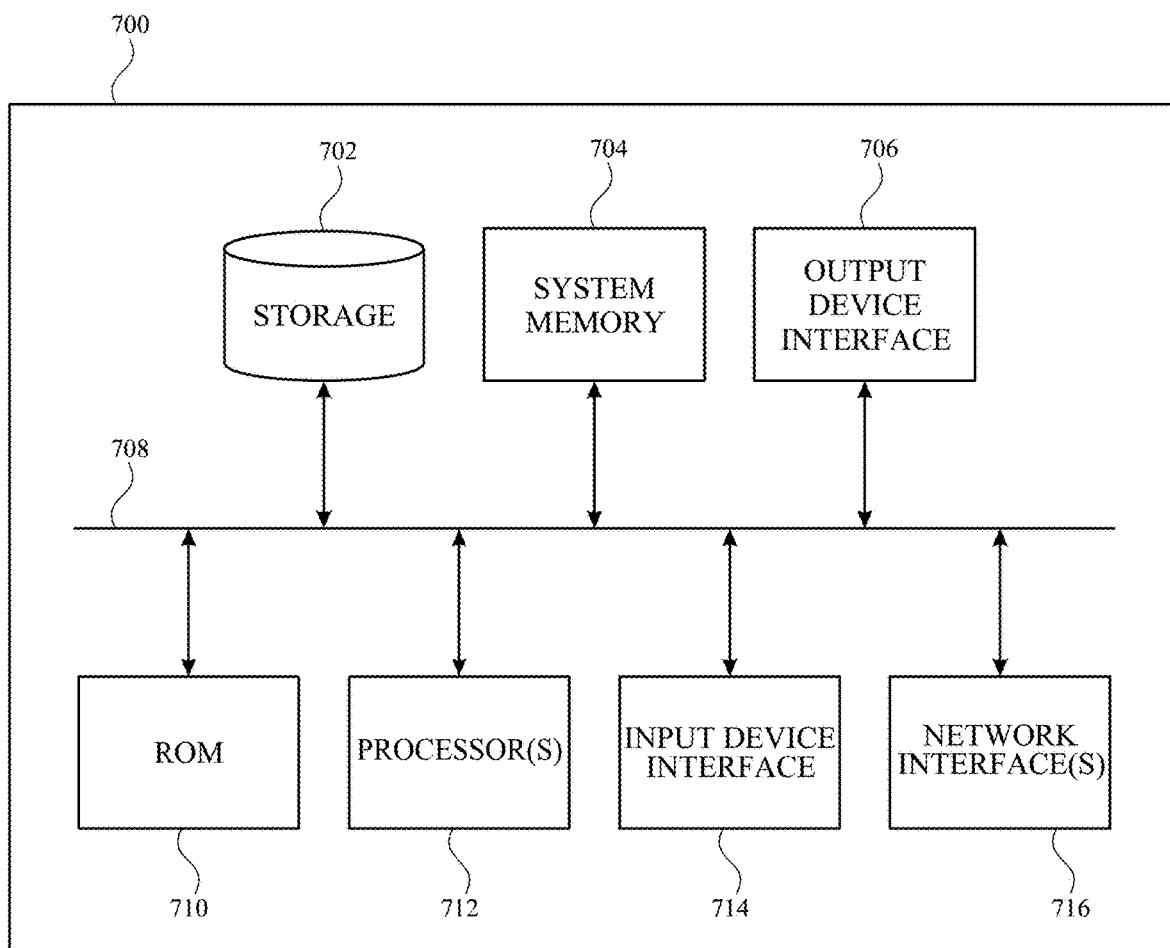
FIG. 7 illustrates an electronic system with which one or more implementations of the subject technology may be implemented.

FIG. 7 illustrates an electronic system 700 with which one or more implementations of the subject technology may be implemented. The electronic system 700 can be, and/or can be a part of, the electronic device 110, and/or the server 120 shown in FIG. 1. The electronic system 700 may include various types of computer readable media and interfaces for various other types of computer readable media. The electronic system 700 includes a bus 708, one or more processing unit(s) 712, a system memory 704 (and/or buffer), a ROM 710, a permanent storage device 702, an input device interface 714, an output device interface 706, and one or more network interfaces 716, or subsets and variations thereof.

The bus 708 collectively represents all system, peripheral, and chipset buses that communicatively connect the numerous internal devices of the electronic system 700. In one or more implementations, the bus 708 communicatively connects the one or more processing unit(s) 712 with the ROM 710, the system memory 704, and the permanent storage device 702. From these various memory units, the one or more processing unit(s) 712 retrieves instructions to execute and data to process in order to execute the processes of the subject disclosure. The one or more processing unit(s) 712 can be a single processor or a multi-core processor in different implementations.

The ROM 710 stores static data and instructions that are needed by the one or more processing unit(s) 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory. The system memory 704 may store any of the instructions and data that one or more processing unit(s) 712 may need at runtime. In one or more implementations, the processes of the subject disclosure are stored in the system memory 704, the permanent storage device 702, and/or the ROM 710. From these various memory units, the one or more processing unit(s) 712 retrieves instructions to execute and data to process in order to execute the processes of one or more implementations.

The bus 708 also connects to the input and output device interfaces 714 and 706. The input device interface 714 enables a user to communicate information and select commands to the electronic system 700. Input devices that may be used with the input device interface 714 may include, for example, alphanumeric keyboards and pointing devices (also called "cursor control devices"). The output device interface 706 may enable, for example, the display of images generated by electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 7, the bus 708 also couples the electronic system 700 to one or more networks and/or to one or more network nodes, such as the electronic device 110 and/or 115 shown in FIG. 1, through the one or more network interface(s) 716. In this manner, the electronic system 700 can be a part of a network of computers (such as a LAN, a wide area network ("WAN"), or an Intranet, or a network of networks, such as the Internet. Any or all components of the electronic system 700 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A system comprising;
   a processor;
   a memory device containing instructions, which when executed by the processor cause the processor to:
   generate machine learning (ML) model code from a ML document file corresponding to a ML model, the ML document file being in a first data format, the ML document file being converted to code in a second data format different than the first data format;
   receive additional code that calls a function provided by the ML model code;
   compile the ML model code and the additional code, the compiled ML model code including object code corresponding to the compiled ML model code and the compiled additional code including object code corresponding to the additional code;
   generate a package including the compiled ML model code and the compiled additional code; and
   send the package to a runtime environment on a target device for execution.

2. The system of claim 1, wherein compiling the ML model code is based on a selection of the target device.

3. The system of claim 1, wherein the target device is a cloud computing platform.

4. The system of claim 1, wherein the memory device contains further instructions, which when executed by the processor, further cause the processor to:
   generate respective compiled ML model code for a plurality of target devices, each of the plurality of target devices being a different device.

5. The system of claim 1, wherein the compiled ML model comprises an archive suitable for an application store.

6. The system of claim 1, wherein the memory device contains further instructions, which when executed by the processor, further cause the processor to:
   receive a transformed ML model file, the transformed ML model file being compliant with a particular model specification and including code written in a particular object oriented programming language, wherein the transformed ML model file corresponds to a ML model in a particular data format;

provide a user interface that includes a graphical view of the transformed ML model file, the graphical view comprising a display of an object corresponding to the transformed ML model file; and provide, within the user interface, a listing of code associated with the transformed ML model file.

7. The system of claim 6, wherein the graphical view further displays a hierarchical view of an object with different properties and a list of associated files.

8. The system of claim 7, wherein the object comprises a code representation of the transformed ML model file, the code representation corresponding to the particular object oriented programming language.

9. The system of claim 6, wherein the listing of code includes code for implementing the transformed ML model file in the object oriented programming language.

10. A method comprising:

generating machine learning (ML) model code from a ML document file corresponding to a ML model, the ML document file being in a first data format, the ML document file being converted to code in an object oriented programming language different than the first data format;

receiving additional code that calls a function provided by the ML model code;

compiling the ML model code and the additional code, the compiled ML model code including object code corresponding to the compiled ML model code and the compiled additional code including object code corresponding to the additional code;

generating a package including the compiled ML model code and the compiled additional code; and sending the package to a runtime environment on a target device for execution.

11. The method of claim 10, wherein compiling the ML model code is based on a selection of the target device.

12. The method of claim 10, wherein the target device is a cloud computing platform.

13. The method of claim 10, further comprising:

generating respective compiled ML model code for a plurality of target devices, each of the plurality of target devices being a different device.

14. The method of claim 10, wherein the compiled ML model comprises an archive suitable for an application store.

15. The method of claim 10, further comprising:

receiving a transformed ML model file, the transformed ML model file being compliant with a particular model specification and including code written in a particular object oriented programming language, wherein the transformed ML model file corresponds to a ML model in a particular data format;

providing a user interface that includes a graphical view of the transformed ML model file, the graphical view comprising a display of an object corresponding to the transformed ML model file; and providing, within the user interface, a listing of code associated with the transformed ML model file.

16. The method of claim 15, wherein the graphical view further displays a hierarchical view of an object with different properties and a list of associated files.

17. The method of claim 16, wherein the object comprises a code representation of the transformed ML model file, the code representation corresponding to the particular object oriented programming language.

18. The method of claim 15, wherein the listing of code includes code for implementing the transformed ML model file in the object oriented programming language.

19. A non-transitory computer-readable medium comprising instructions, which when executed by a computing device, cause the computing device to perform operations comprising:

generating machine learning (ML) model code from a ML document file corresponding to a ML model, the ML document file being in a first data format, the ML document file being converted to code in an object oriented programming language different than the first data format;

receiving additional code that calls a function provided by the ML model code;

compiling the ML model code and the additional code, the compiled ML model code including object code corresponding to the compiled ML model code and the compiled additional code including object code corresponding to the additional code;

generating a package including the compiled ML model code and the compiled additional code; and sending the package to a runtime environment on a target device for execution.

20. The non-transitory computer-readable medium of claim 19, wherein compiling the ML model code is based on a selection of the target device.

* * * * *